United States Patent Office 3,523,128
Patented Aug. 4, 1970

3,523,128
PRODUCTION OF CONCENTRATED AQUEOUS
TANTALUM OXALATE SOLUTION
Edwin J. Bielecki, Boyertown, and John F. Markoski, Pottstown, Pa., assignors to Kawecki Chemical Company, New York, N.Y., a corporation of Pennsylvania
No Drawing. Filed June 17, 1968, Ser. No. 737,364
Int. Cl. C07f 9/00
U.S. Cl. 260—429                          2 Claims

ABSTRACT OF THE DISCLOSURE

This is a method of producing solubilized tantalum in the form of a concentrated aqueous solution of tantalum oxalate, its high concentration being predicated upon (a) the precipitating conditions whereby soluble tantalum in the form of $TaF_7^=$ is precipitated as a form of $Ta(OH)_5$ which is reactive with oxalic acid, (b) how the precipitate is washed to remove entrained fluoride ions, and (c) how soon after its precipitation the $Ta(OH)_5$ is used for conversion to the concentrated oxalate solution.

---

This invention relates to tantalum chemistry and, more particularly, to a method of converting a commonly available tantalum fluoride to the form of a concentrated aqueous solution of tantalum oxalate from which other tantalum compounds and tantalum metal can be produced.

The production of tantalum metal and of various tantalum compounds generally proceeds from tantalum fluoride as a starting material. However, for many tantalum products, such as catalysts and the like, it is desirable that the product be obtained without the fluoride contamination or complications characteristic of starting from tantalum fluoride. In particular, it is of significant advantage to many users to have available as a starting material a water-soluble tantalum compound, and generally the utility will be greater if the tantalum starting material is available in the form of a highly concentrated aqueous solution.

We have found that it is possible to produce a concentrated aqueous solution of tantalum oxalate which meets these requirements for a tantalum chemistry starting material other than a fluoride, and we have discovered that such a material can be obtained from the more readily available tantalum fluoride provided (a) that certain conditions are maintained during precipitation of the tantalum fluoride to tantalum hydrate, (b) that the precipitated hydrate is washed under certain conditions, and (c) that the washed hydrate is converted to the oxalate within a definite time limit. According to this discovery, the method of the present invention comprises:

(1) Forming an aqueous solution containing tantalum in the form of $TaF_7^=$ in an amount of at least about 20 grams per liter expressed as $Ta_2O_5$;

(2) Ammoniating the tantalum-containing solution to a pH of at least about 7.8 but not above about 8.2 to precipitate its tantalum content as $Ta(OH)_5$;

(3) Washing the precipitate with water to a negative F⁻ test;

(4) Filtering the washed precipitate so as to remove mechanically from the filter cake as much as possible of the therein entrained water;

(5) Then, within 7 days from the time of precipitation of the $Ta(OH)_5$, admixing with the resulting filter cake, at a temperature ranging from ambient to about 70° C., about 2 parts by weight of dry oxalic acid dihydrate per part of contained $Ta_2O_5$ in the filter cake to form an aqueous mass containing dissolved tantalum oxalate;

(6) Cooling the resulting aqueous mass to below the ambient temperature to crystallize out any unreacted oxalic acid; and (7) Filtering the cooled solution to remove any entrained solids and to obtain as a filtrate the desired fluoride-free aqueous solution in the form of a tantalum oxalate solution has a specific gravity of at least about 1.2, each of steps 2 through 7 being carried out at temperatures not exceeding about 70° C.

The source material for the practice of the invention can be any aqueous tantalum fluoride solution in which the tantalum is present as $TaF_7^=$. Such solutions include those of $H_2TaF_7$ and $(NH_4)TaF_7$. The tantalum component of such source materials is precipitated in the form of $Ta(OH)_5$ by ammoniation pursuant to the invention, and the more dilute the starting material the finer the precipitate. It has been found that the finer $Ta(OH)_5$ precipitates are less satisfactory for conversion into a concentrated aqueous tantalum oxalate solution because of their relatively high moisture content when filtered and of the greater difficulty in washing, filtering and handling these fine particles. Accordingly, it presently appears that the $TaF_7^=$ concentration of the source material, when expressed as $Ta_2O_5$, should be at least 20 grams per liter. In general, it is preferred to use such solutions containing from about 40 to about 60 grams per liter of tantalum expressed as equivalent $Ta_2O_5$, but higher concentrations can be used without any significant effect upon the final results.

The precipitation of the tantalum from the $TaF_7^=$ source solution is effected by ammoniation. Thus, ammonia gas can be introduced directly into the tantalum source solution so that the resulting agitation will prevent the development of locally excessive pH. On the other hand, the tantalum fluoride ($H_2TaF_7$) solution can be added, advantageously with simultaneous agitation, to an ammonium hydroxide solution which is maintained ammoniacal by the constant addition of ammonia gas. In either procedure, the ammoniation is carried out to a final pH of at least about 7.8, and advantageously within the pH range of 7.8 to 8.2. A minimum pH of about 7.8 is required to obtain substantially complete precipitation of the tantalum as tantalum hydroxide $[Ta(OH)_5]$. The maximum final pH of about 8.2 is of importance because it has been found that the precipitated tantalum hydroxide is resistant to subsequent reaction with oxalic acid, or if it does so react the resulting tantalum oxalate is unstable and spontaneously decomposes, whenever the pH of the precipitation mass is permitted to exceed 8.2.

It is a characteristic feature of the method of this invention that high temperatures are avoided, and that normal heat development be controlled, up through the conversion of the source material to tantalum oxalate, because heat tends to favor the sequestering of fluorine in the form of $(NH_4)_2TaOF_5$ which is not readily convertible to tantalum oxalate. The normal heat development caused by the neutralization reaction is preferably so controlled as to limit the reaction mass temperature to a maximum of 70° C.

The resulting precipitate of tantalum hydrate, $Ta(OH)_5$, is washed free of fluoride ions by separating the aqueous phase and washing the solid $Ta(OH)_5$ thoroughly with water at ambient temperature to the point of a negative standard analytical F⁻ test in the wash water. This separation and washing is advantageously effected by settling and decantation, and it has been found that when the precipitated $Ta(OH)_5$ will no longer settle readily from a fresh batch of wash water it is indicative of the desired negative F⁻ content. Although ordinary water can be used for washing, the use of deionized wash water leads to a higher purity in the final tantalum oxalate solution. Ammoniation of the wash water, useful in washing a corresponding niobium hydrate, adversely affects the subsequent reactivity of the washed tantalum hydrate with oxalic acid.

The washed tantalum hydrate is then separated as completely as possible from the wash water because residual entrained water ultimately becomes a diluent in the final tantalum oxalate solution product. This separation is effected mechanically, as distinguished from drying by heat, in order to avoid ageing of the tantalum hydrate. Ageing of the hydrate appears to render it refractory with respect to oxalic acid for its subsequent conversion into tantalum oxalate, and it will be observed that the use and development of high temperatures, that is, temperatures above 70° C., have been avoided throughout the method of the invention. Accordingly, separation of wash water from the tantalum hydrate precipitate is effected by filtering with the aid of suction or blowing with ambient air, or both.

The relatively dry filter cake of tantalum hydrate is then converted into tantalum oxalate within a period of 7 days from the time that it was precipitated under the conditions recited hereinbefore. It has been found that such conversion, attempted after the seventh day of precipitation and otherwise treated as described hereinbefore, resists oxalation and produces only a relatively dilute tantalum oxalate solution.

The conversion of the tantalum hydrate to tantalum oxalate is effected by admixing dry oxalic acid dihydrate with the filter cake. The amount of oxalic acid dihydrate used for this conversion is about 2 parts by weight of the oxalic acid per part of $Ta_2O_5$ present in the hydrate. Lesser amounts of oxalic acid lead to incomplete conversion of the tantalum content of the hydrate to the oxalate, and greater amounts of the oxalic acid tend to remain insoluble or to crystallize out of the cooled tantalum oxalate solution if it has previously been warmed to facilitate the conversion. The simple admixing and stirring of the oxalic acid dihydrate wth the washed and de-watered tantalum hydrate filter cake, at temperatures ranging from ambient temperature to about 70° C., cause the cake to be directly and efficiently converted to a concentrated aqueous solution of tantalum oxalate without decomposition of the tantalum oxalate.

The resulting tantalum oxalate solution is separated from any undissolved tantalum hydrate and solid oxalic acid by permitting it to equilibrate for a period of a few days. To achieve this result, it has been found advantageous, but not necessary, to cool the solution somewhat below ambient temperature, say to about 15° C., so as to insure crystallization of any solid which might otherwise tend to crystallize out with time from the final clear tantalum oxalate solution. The liquor is then filtered by any means, advantageously with a cellulosic filtering aid or the like, to obtain a clear, nearly colorless, concentrated aqueous solution of tantalum oxalate having a specific gravity of about 1.4. With less care given to removing excess water during the process, specific gravities as low as about 1.2 are obtained, while meticulous care in this respect can yield a product having a specific gravity higher than 1.4. The solution having a specific gravity of about 1.4 will contain about 165–170 grams per liter of tantalum, expressed as Ta, and is useful as a concentrated source of tantalum for the production of other tantalum-containing products such as catalysts and the like.

The following specific example is representative of the practice of the method of the invention:

A volume of fluotantalic acid containing 25 pounds of $Ta_2O_5$ at a concentration of 50 g./l. was ammoniated by passing ammonia gas into the solution over a two-hour period during which the pH of the slurry of tantalum hydroxide was raised to, but not in excess of, 8.0. The slurry of hydroxide particles was allowed to settle for six hours and then the clear liquor was decanted. A volume of water, approximately equivalent to the volume decanted, was added to the settled slurry. After mixing and settling, the supernatant liquor was decanted. This water washing and decantation was continued for a total of four washes to remove all soluble salts, as indicated by the fact that the decanted liquor from the last wash was fluoride ion-free and ammonia-free. The residual slurry was dewatered in a filter press, and analysis of the filter cake showed it to contain 45% $Ta_2O_5$. This precipitation, washing and filtering procedure required a period of three days.

The conversion of the $Ta(OH)_5$ filter cake to tantalum oxalate was effected on the fourth day after precipitation by mixing 44.4 pounds of the $Ta(OH)_5$ filter cake (comprising 20 pounds of $Ta_2O_5$) with 37.5 pounds of oxalic acid dihydrate ($H_2C_2O_4 \cdot 2H_2O$). The resulting paste gradually became fluid and was easily stirred until it became a thin slurry. The slurry was heated slowly so as to raise the temperature 15° C. per hour, and by the time its temperature reached 55° C. all of the $Ta(OH)_5$ had reacted with the oxalic acid and the solution was no longer turbid. The resulting tantalum oxalate solution was cooled to 17° C. and was maintained at 17° C.–20° C. for two days to permit the solution to equilibrate. A cellulosic filter aid was then added to the cooled solution to adsorb trace quantities of foreign matter, and the solution was filtered and analyzed. It contained 165 g./l. of Ta and 185 g./l. oxalate ion.

We claim:
1. The method of producing a concentrated aqueous tantalum oxalate solution containing at least 150 grams of tantalum per liter which comprises:
   (1) forming an aqueous tantalum-source solution containing tantalum in the form of $TaF_7^=$ in amount of at least about 20 grams per liter expressed as $Ta_2O_5$,
   (2) ammoniating the tantalum-containing solution to a pH of at least about 7.8 but not above about 8.2 to precipitate its tantalum content as $Ta(OH)_5$,
   (3) washing the precipitate with water to a negative $F^-$ test,
   (4) filtering the washed precipitate so as to remove mechanically from the filter cake as much as possible of the therein entrained water,
   (5) then, within 7 days from the time of precipitation of the $Ta(OH)_5$, admixing with the resulting filter cake, at a temperature ranging from ambient to about 70° C., about 2 parts by weight of dry oxalic acid dihydrate per part of contained $Ta_2O_5$ in the filter cake to form an aqueous mass containing dissolved tantalum oxalate,
   (6) cooling the resulting aqueous mass to below the ambient temperature to crystallize out any unreacted oxalic acid, and
   (7) filtering the cooled solution to remove any entrained solids and to obtain as a filtrate the desired aqueous solution in the form of a tantalum oxalate solution having a specific gravity of at least about 1.2, each of steps 2 through 7 being carried out at temperatures not exceeding about 70° C.

2. The method according to claim 1 in which the tantalum content of the source solution is about 40 to 60 grams per liter expressed as equivalent $Ta_2O_5$.

References Cited

UNITED STATES PATENTS 3,450,729   6/1969   Larkins et al. _____ 260—429

OTHER REFERENCES

Edmister et al.: J. Am. Chem. Soc., 54 (1932), pp. 438–442.

TOBIAS E. LEVOW, Primary Examiner

A. P. DEMERS, Assistant Examiner

U.S. Cl. X.R.

75—84